United States Patent [19]

Esposito

[11] Patent Number: 4,627,208

[45] Date of Patent: Dec. 9, 1986

[54] STRUCTURAL ELEMENT ESPECIALLY SUITABLE FOR SOLAR GREENHOUSES AND THE LIKE

[75] Inventor: Christopher Esposito, West Bay Shore, N.Y.

[73] Assignee: Four Seasons Solar Products Corp., Farmingdale, N.Y.

[21] Appl. No.: 708,501

[22] Filed: Mar. 5, 1985

Related U.S. Application Data

[62] Division of Ser. No. 455,475, Jan. 4, 1983.

[51] Int. Cl.$^4$ ............................................. E04B 5/52
[52] U.S. Cl. ........................................ 52/483; 52/731
[58] Field of Search .................. 52/731, 730, 222, 63, 52/475, 86, 483; 160/273 R

[56] References Cited

U.S. PATENT DOCUMENTS

| | | | |
|---|---|---|---|
| 3,051,232 | 8/1962 | Lamb | 160/273 R X |
| 3,136,395 | 6/1964 | Rebele | 52/731 |
| 3,382,639 | 5/1968 | Smith et al. | 52/731 |
| 4,031,680 | 6/1977 | Stoakes | 52/475 X |
| 4,057,941 | 11/1977 | Schwartz | 52/222 X |
| 4,137,687 | 2/1979 | Sprung | 52/86 X |

Primary Examiner—Carl D. Friedman
Attorney, Agent, or Firm—Roberts, Spiecens & Cohen

[57] ABSTRACT

A structural arrangement is provided which is particularly useful in connection with solar greenhouses. The structural member is provided as a hollow bar of elongated form provided with at least one longitudinally extending track channel having a relatively narrow longitudinally extended slot-mouth. The bar may be provided with two such channels substantially circular in cross-section with the mouths defining reentrant angles. In a solar greenhouse, members of the above type support a glazing with a curved-eave section, the bars being curved to shape and the channels therein accommodating the bulbous lateral edges of shades which are retained therein.

2 Claims, 5 Drawing Figures

STRUCTURAL ELEMENT ESPECIALLY SUITABLE FOR SOLAR GREENHOUSES AND THE LIKE

OTHER APPLICATIONS

This application is a divisional application based on my earlier filed co-pending application, Ser. No. 455,475, filed Jan. 4, 1983.

FIELD OF INVENTION

This invention relates to improvements in solar greenhouses and the like and more particularly to improved structural members suitable for providing guidance for shading and like types of members.

BACKGROUND

Solar greenhouses may be elegantly designed and proportioned to complement the beauty of a dwelling. They provide a versatile form of additional living space that can capture and store solar energy. Provision is thus made for a practical addition which confines a place in the sun for gardening, dining, lounging and so forth. In fact, such additional spaces have been used for accommodating hot tubs and spa accoutrements and the like.

Commercial systems are available for providing selective shading for solar greenhouses and the like. In one known arrangement, a shade is transferred from one motor driven towards a second motor driven roller by straps which are fastened to the leading edge of a shade, these straps being attached to one of the rollers and being wound upon the same to draw the shade from the other roller upon which the shade is coiled and normally stored. In addition, the leading edge of the shade is provided in the form of a rigid member, the edges of which are guided in a channel provided in a guiding member which has no structural function and is intended solely for the purpose of being a shade guide.

An inspection of the available system reveals that the leading rigid element of the aforegoing system extends laterally beyond the lateral edges of the shade so that the lateral edges of the shade are spaced from the guide and thus provide means for an inadvertent passage of solar radiation or the like between the guides and the shade edges. It is also to be noted that the guides have no structural function to be performed as has been noted hereinabove, and that the guides are generally mounted inwardly of the solar greenhouse structure in such a manner as to be readily receptive of inadvertent damaging forces or the like. Moreover, it will be noted that the shade is inconveniently positioned with its lateral edges subject to damage deterioration.

SUMMARY OF THE INVENTION

It is a general object of the invention to provide improved systems and structural members to enable the selective shading and shielding of solar greenhouses and the like inclusive of, but not limited to, the selective erection of shielding walls relative to swimming pools and other such accommodations.

It is a further object of the invention to provide improved structural elements suitable for use in solar greenhouses and the like in order to provide for ready installation of shading systems and glazing.

Yet another object of the invention is to provide for improved insulating and shading systems for solarium type greenhouses and the like utilizing integral built-in tracks to carry shading fabric so that the fabric may be readily held taut between two such tracks without sag.

Still another object of the invention is to provide an insulating and shading system for solar greenhouses including curved eave portions in which the insulating shade fabric travels from, for example, a top ridge around the curved eave-section to a bottom sill without the intervention of guide rollers adjacent the curved-eave section.

Yet another object of the invention is to provide an insulating and shading system wherein intergral built-in track channels are made accessible at the top and bottom of the tracking system by improved designing of the structural members into which the integral tracks are incorporated.

It is yet a further object of the invention to provide for a multiplicity of shade panels which may be activated simultaneously or selectively in correspondence with panels incorporated into a solar greenhouse construction.

Still another object of the invention is to provide an insulating and shading system designed to provide a maximum insulation and sun shading as well as such privacy as may be desirable in a glass structure and to accomplish these results with the least obtrusive and amount of visible parts.

It is an additional object of the invention to provide an improved tracking system which fixes the spacing between an associated glazing arrangement and shading system to minimize the possibility of damage to the glazing.

It is still a further object of the invention to provide for the incorporation of improved track channels into a structural member to provide in turn for ready displacement for a shade or shielding fabric or the like through a curved-eave portion in such a manner as to eliminate the need for associated guide rollers or other surplus structure, thereby simplifying the construction of shading and insulating systems and minimizing the cost thereof.

In achieving the above and other objects of the invention, there is provided a structural member constituted of an elongated hollow bar provided with at least one longitudinally extending track channel having a relatively narrow longitudinally extending slot-type mouth. Adventageously, the bar is provided with a second track channel and mouth, arranged in mirror image relationship to the aforesaid channel and mouth and opening in opposite direction with respect to the same.

In accordance with a preferred embodiment of the invention, the channels are substantially circular in cross-section and the mouths define reentrant angles therewith. Preferably, the mouths also have widths which are no more than about 50% of the diameters of the channels.

In a specific embodiment of the invention, the bar is generally quadrilateral in shape and includes two pairs of parallel sides, said mouths being located in the sides of one pair. The sides of the other pair are provided with screw grooves.

In accordance with a further aspect of the invention, one of the sides of the aforesaid other pair is provided with at least one channel adapted for receiving a sealing member. A sealing member may be arranged in the latter said channel and a glazing member may be provided to rest against the sealing member. The glazing member will be held against the structural member by a muntin or the like arranged to rest against the glazing member, there being provided a fastening device extending through the muntin into the corresponding screw groove.

In accordance with a specific feature of the aforesaid structural member, each of the channels which are provided for tracking is at least partly defined by two interior walls. One of these interior walls has two opposed surfaces conforming to the shape of the corresponding channel, and the other of the interior walls has two opposed surfaces, one of which conforms to the shape of the corresponding channel and the other of which is flat.

The aforesaid structural member may be incorporated into, for example, a solar greenhouse construction. This solar greenhouse construction may, in accordance with the invention, comprise a glazing support means to support said glazing in a conformation to define a at least partly enclosed space, said glazing being permeable to solar radiation to allow the radiation to pass into the space, there being provided a shade means in the space adapted for being positioned adjacent at least part of the glazing to intercept at least part of the radiation passing through the glazing. The support means includes at least one of the aforesaid structural members and is provided with at least one track channel in which the shade means is engaged and by which the shade means is guided along the glazing. Thus, the invention distinguishes from what has been previously available in that it provides for incorporating a track channel into a structural member with the shade means being directly engaged by and incorporated into the structural members of the greenhouse.

According to various aspects of the invention, the shade means may include a roller and a shade coupled to the same and being adapted for being rolled onto tha unrolled from the roller. The invention also incorporates the commercially available arrangement whereby a motor is provided within the roller to drive the same. In accordance with one embodiment of the invention, the shade means may include rollers spaced vertically along the glazing with a shade being coupled to each of the rollers and adapted for being drawn from one of the rollers towards the other of the rollers. As has been implied hereinabove, the glazing preferably includes a curved-eave portion along which extends the above noted support means and the aforesaid channel or channels.

The invention in one form provides for a support means which includes at least two spaced and parallel glazing bars supporting and spanned by at least part of the glazing. Each of these glazing bars is provided, in the form noted above, with at least one of the above-described track channels. The track channels in the bars are aligned in parallel with the shade extending between the two channels and being held taut thereby. The shade means or shade may include parallel bulbous peripheries engaged in respective of the channels and, in this arrangement, the channels are provided with relatively narrow slot-type mouths opening from the bars whereby to admit the entry of the shade means and to entrap the bulbous peripheries in these channels. As a possible alternative, or included in the arrangement generally described hereinabove, the shade means may include cables extending through and beyond these bulbous peripheries, the cables extending as well through the channels in a manner which is peculiarly distinguishable from the arrangement which is known from the prior art.

In accordance with yet another aspect of the invention there is provided a horizontal sill below and supporting the aforesaid support means with the roller arranged at the bottom of the support means being contained within the sill and coupled to the shade means. The shade means may include a plurality of parallel shades with the support means including a plurality spaced parallel glazing bars each provided with two of the afore-described track channels, said channels being arranged in cooperating pairs between which extend respective of the shades.

Advantageously the invention provides for a fixed spacing between the glazing and the associated shades. This advantage is developed from the fact that the structural member includes both the tracking channels and the means for supporting the glazing. Preferrably, this spacing is a minimum of about 1½ inches thereby providing for a most suitable accommodation of the glazing and minimizing possibilities of damage to the same.

In accordance with further features of the invention there is provided an arrangement of generally horizontal cap members covering the aforesaid drain and extending between the aforesaid bars, said cap members including break away sections covering the slots at least in part. The bars extend downwardly past the cap members and include lateral walls, each provided with one of the aforesaid track channels opening into the aforesaid internal chamber. As has been noted above, the aforesaid bars may be hollow members, each including two of the aforesaid lateral walls and inner and outer walls extending between the lateral walls and forming inner and outer corners therewith. The bars may include internal thickened portions constituted by interior walls located at the inner corners and defining in part, the aforesaid track channels. The above-noted inner walls may each be provided with a vertical slot between the aforesaid channels, said vertical slot being bounded by serrated or screw threaded walls whereby to facilitate engagement of an attachment or fastening member or the like. The base sill of the invention may be provided with at least one internal horizontal groove constituting a drainage channel.

The ridge structure to be described in greater detail hereinbelow is provided for engaging the support means at the upper end of the same. The rige structure has preferably a vent provided therein with a blower arranged in the ridge structure and adapted for displacing air from between the shade means and the glazing and expelling the air outwardly through the vent.

The support means includes glazing bars of the type which have been generally described above and the glazing bars may include ends cut at an angle to define a spaced with the ridge structure to permit the appropriate positioning of a guide roll which will be located at least partly in the space defined with the ridge structure to guide the shade such that the lateral edges thereof are received in and guided by the track channels of the glazing bars. The above and other objects, features and advantages of the invention will be found in the detailed description which follows hereinbelow as illustrated in the accompanying drawing.

DETAILED DESCRIPTION

Figure 1:
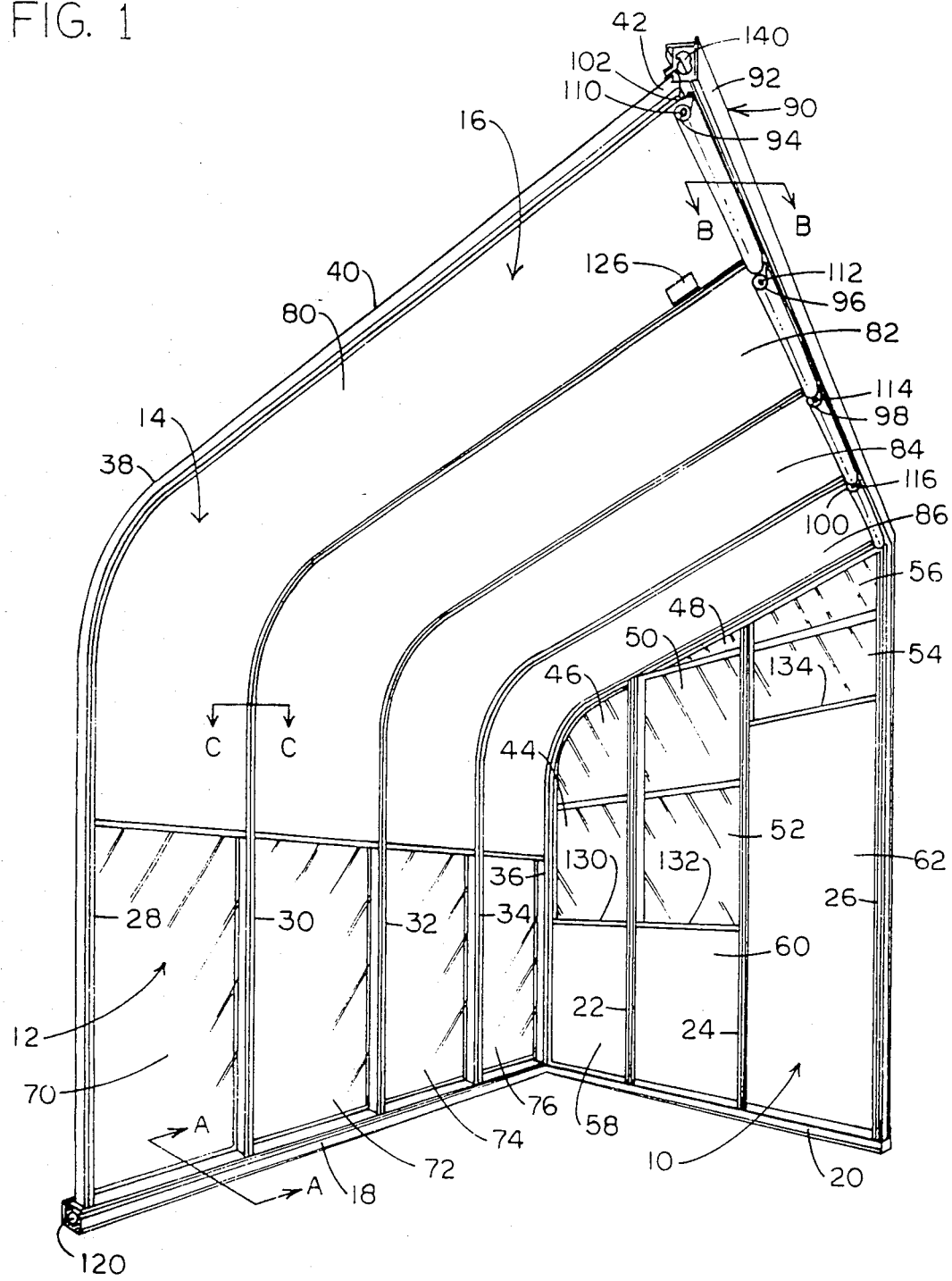
FIG. 1 is an interior perspective view of a portion of a lean-two type solar greenhouse provided with a shading arrangement in accordance with a preferred embodiment of the invention.

In FIG. 1 is illustrated a portion of a lean-two type solar greenhouse of the kind generally in the 1982 Theme Catalog entitled Four Seasons Passive Solar Greenhouse and Sun Space published and distributed by Fours Seasons Solar Corp. of Farmingdale, N.Y. The illustrated portion of the solar greenhouse in FIG. 1 includes a gable end 10 and a front portion 12 having a curved-eave portion 14 and an upper sloped portion 16. Further illustrated are base sills 18 and 20 which may, for example, be mounted on a base wall or flat slab or deck (not shown) with appropriate fasteners. The method of mounting the base sill on the supporting ground is not a feature of the present invention and requires no further description in this text. The gable end 10 includes a plurality of parallel vertical glazing bars such as indicated at 22, 24, and 26. The bar 26 is in abutting relationship against the side of a dwelling or some other such similar construction. The front portion 12 includes a plurality of vertical glazing bars 28, 30, 32, 34 and 36. The glazing bar 36 furthermore provides a connection with gable end 10.

To conform with the shape of the glazing, which it is the purpose of the glazing bars to support, the glazing bar 28 has a curved section 38 and a sloped section 40. It terminates in an end portion 42. Glazing bars 28, 30, 32, 34 and 36 have similar curved and sloped portions.

Glazing panes as comprised by the gable end 10 are indicated in various forms at 44, 46, 48, 50, 52, 54 and 56. Portions of the glazing are concealed by shade fabric as indicated at 58, 60 and 62. The dwelling or other structure against which the solar greenhouse is mounted is not shown as its construction is not essential to an understanding of the present invention.

The glazing included in the front portion 12 includes glazing panes 70, 72, 74 and 76. The remaining glazing in FIG. 1 is concealed by shade fabric or shades 80, 82, 84 and 86. The number of shades and panels in FIG. 1 is illustrative only as a greater or lesser number of panels and glazing panes may be employed in accordance with the invention which is not limited thereby.

At the upper end of the solar greenhouse construction, is located a ridge structure 90. It engages the end portion of the glazing bars at the upper extremities thereof such as indicated at 42 to support and accommodate the same. The ridge structure 90 abuts at the back wall 92 against the dwelling other similar structure associated therewith as does the vertical glazing bar 26 of the gable end 10.

Also appearing in FIG. 1 is a representative sequence of rollers 94, 96, 98 and 100. These rollers in the illustrated embodiment are source rollers of shade fabric which store and supply the rolled up shade fabric upon demand. Further illustrated in FIG. 1 is a guide roll 102 which guides the shades or shade fabric in a change of direction so that the edges of these shades or fabrics may be engaged in track channels provided in the vertical glazing bars as will be described in greater detail hereinbelow. It is to be noted in the diagrammatic illustration of source rollers 94, 96, 98 and 100 that interior motor 110, 112, 114 and 116 are shown. These motors are contained and concealed within the rollers and operate to drive the same. Rollers with internal motors to drive the same are commercially available. They may be obtained from Somfy Systems, Inc. of Edison, N.J. The motors are of a asynchronous capacitor start and run, single phase type rated as 120 V. and 60 Hz. They are thermally protected totally enclosed brushless type motors equipped with permanently lubricated bearings requiring no maintenance and being relatively easy to wire. They include solenoid activated disc brakes which automatically stop and hold a load in any position without slippage whenever current to the motor is interrupted. The locking action assures safety and reliability of operation of the motorized system. The system can be provided with a limit switch to set the exact length of travel in both up and down directions automatically. A planetary type gear system is employed to lower motor speed and improve torque. Other details of the motor system can be found in U.S. Pat. No. 3,718,215.

The upper motorized rollers cooperate with corresponding motorized rollers concealed in the base sill 18. In the illustration, one motorized system is exposed by the cutaway such as, for example, seen at 120. The arrangement is such that, when the rollers in the sill 18 are operated to draw shade fabric downwardly, the motorized roller systems indicated at 94, 96, 98 and 100 permit the withdrawing of shades therefrom. The electrical system and operation is reversed when the shades 80, 82, 84 and 86 are to be drawn upwardly. In this case, the motorized systems indicated at 94, 96, 98 and 100 are actuated and the concealed systems in the base sill 18 release the material for being rolled back upon the upper rollers to expose greater and greater amounts of the glazing as the operation continues. Also illustrated in FIG. 1, in diagrammatic form, is a photoelectric sensor 126. This photoelectric sensor is coupled in an electric circuit (not shown) connected with the aforementioned motors in order to drive the same in one or the other rotary directions as may be required. The photoelectric sensor 126 is representative only of any device capable of sensing an ambient condition such as solar radiation, temperature, wind and the like for purposes of automating the operation of the rollers. It will be noted, however, that, while the motorized roller systems are employed in accordance with the preferred embodiment of the invention, it is also possible that the shades be operated manually and also in connection with spring-loaded rollers as is the case in connection with domestic shades as are commonly and commercially available. In fact, a manually operated shade arrangement is indicated in association with end 10. Thus, there are no upper rollers associated with shades 58, 60 and 62, these being drawn from concealed rollers in base sill 20 by a manual operation of grasping rigid leading edge members indicated by way of example at 130, 132 and 134.

Also exposed in the illustration of FIG. 1 in diagrammatic form is a blower 140. The puspose of this blower (as will be illustrated and described in greater detail hereinbelow) is to evacuate air from between the shade and the associated glazing and to expel this air into the ambient atmosphere via an appropriate vent in order to reduce the temperature which prevails between the shades and the glazing thereby to reduce the possibility of damage to the glazing.

Figure 2:
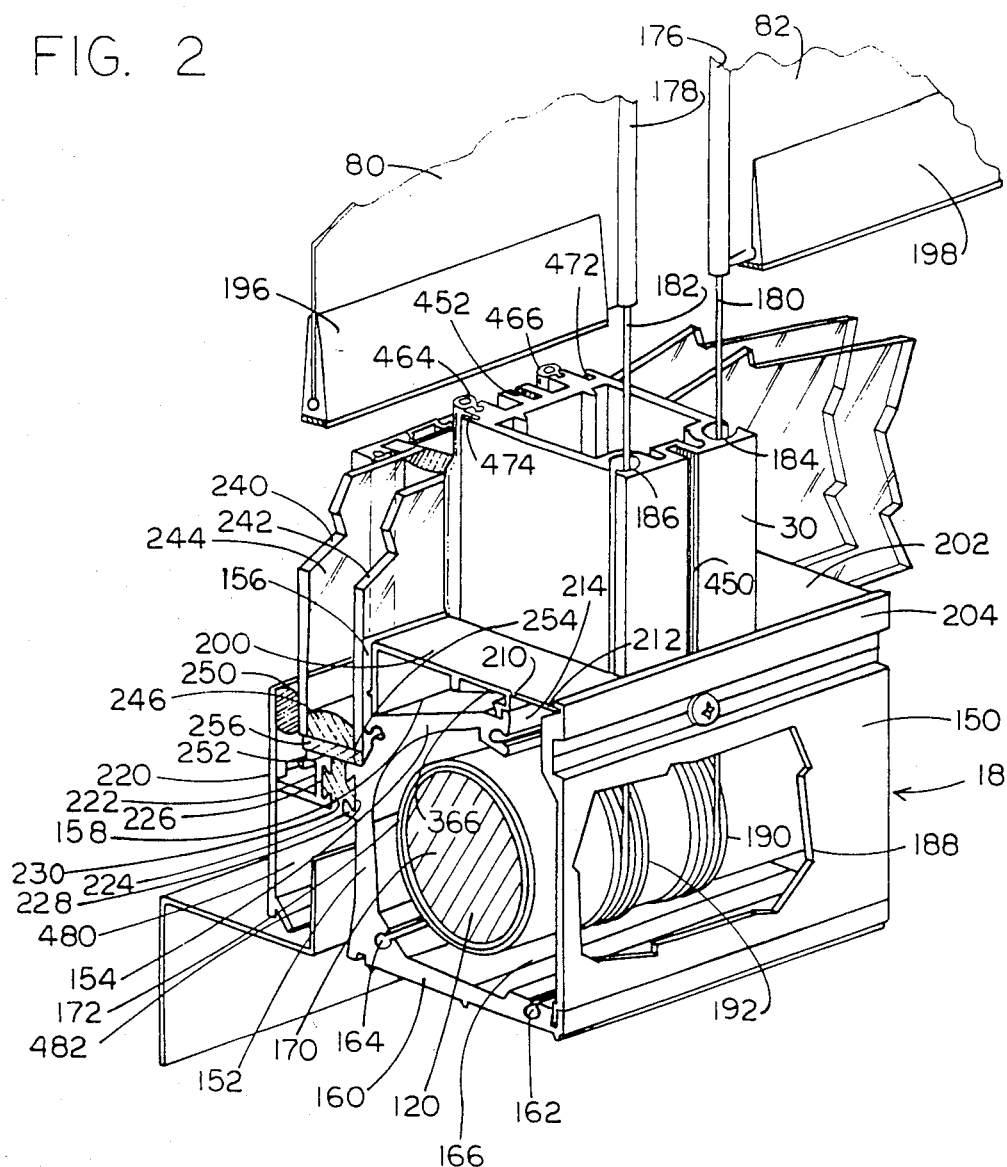
FIG. 2 is a partly diagrammatic and perspective view of a broken-away portion of the bottom sill construction embodied in the structure of FIG. 1 in correspondence with line A—A in FIG. 1.

FIG. 2 illustrates on an enlarged scale a broken-away portion of the structure illustrated in FIG. 1 with conditions somewhat altered to show a more lowered condition of the shades. For purposes of orientation, it will be seen in FIG. 2 that there are illustrated base sill 18, vertical glazing bar 30 and shades 80 and 82. The base sill 18 includes an inner wall 150 and a first outer wall 152. The outer wall 152 supports a sloped upper wall 154 from which extends a vertical wall 156. The walls 154 and 156 cooperate to define a moisture drain 158. A bottom wall 160 extends between and connects the inner wall 150 with the outer wall 152. Drainage channels 162 and 164 are provided in horizontal disposition within the internal chamber 166 which is cooperatively defined by walls 150, 152, 154 and 160. Within the chamber 166 is accommodated the motorized roller system including the internal motor 170 and the encircling roller 172. Each of the shades illustrated includes a bulbous lateral edge portion for purposes of being accommodated in and guided by track channels to be referred to hereinbelow.

Illustrative bulbous lateral edge portions or peripheries are indicated at 176 and 178 in FIG. 2. These constructions are commercially available and are generally of the type including wires extending through the bulbous peripheries and axially extending out of the same. Two such wires or cables are indicated at 180 and 182 in FIG. 2. They extend through and are guided by track channels 184 and 186 as will be described in greater detail hereinbelow. It is to be noted that, by reason of break-away portion 188, it is possible to see that these cables are attached to and wound onto roller 172 such as indicated 190 and 192. A winding up of these cables on the roller 172 causes the shades 80 and 82 to be drawn down towards the base sill 18 thereby to effect a greater degree of shading. This means that solar radiation passing through the glazing which is permeable thereto may be intercepted by the shades thereby to effect a greater or lesser degree of shielding as desired and as may be manually or automatically controlled. It will also be noted in FIG. 2 that the shades 80 and 82 are provided with rigid lead members 196 and 198. These members, at their extreme downward movement, come into abutting or substantially abutting relationship with cap elements 200 and 202 which are intended to cover drains such as indicated at 158 and to conceal the internal construction of the base sill 18 from viewing or from the damaging impact of dropped articles or the like. The caps 200 and 202 also constitute safety features inasmuch as they resist the penetration of probing fingers and the like which might otherwise be damaged by engagement with moving parts within the base sill 18 under inadvertent circumstances.

The cap members 200 and 202 extend generally from the vertical wall 156 to the upper lip 204 of the front wall 150. This is satisfactory in the case where the cables, such as indicated 180 and 182, extend through the glazing bar to the internal roller 172 which in this case acts take-up roller. In these circumstances, there is no need for the lead members 196 and 198 to move into the internal chamber 166 nor is there any need for the shade 80 or 82 to do likewise. In the event that it is desired to alter the construction so that the shade 80 and 82 can be directly taken-up on the roller 172 in addition to the cables 180 and 182 which they trail, the construction can be readily modified to provide a slot through which the shade 80 and 82 may pass. Thus, for example, the cap member 200 is provided with a notch 210 providing a break-away section 212 to expose a slot or passage 214 illustrative of a passageway through which the shades may enter the internal chamber 166 for engagement and being taken-up upon an associated roller. Thus, the invention includes the options whereby it is exclusively the cables which are taken-up on the lowermost roller or rollers or whereby the shades themselves are taken-up upon such roller or rollers.

FIG. 2 furthermore illustrates a second outer wall 220. This outer wall includes a protrusion 222 in facing relationship with a protrusion 224 on the outer wall 152. These two protrusions are provided with facing grooves 226 and 228 which have reentrant angles therein so that a thermal break member 230 having the form of a Maltese cross may be entrapped therein to prevent the flow of heat from the wall 152 to the wall 220.

The glazing is illustratively shown in the form of a double paned glass or plastic structure, the spaced panes being indicated at 240 and 242 with a spacing 244 therebetween To maintain this spacing, there is provided a spacer 246. The pane 242 rests against the vertical wall 156 and the glazing as a whole is entrapped between the wall 156 and 220 by means of a gasket 250 of a theremally insulative type. The upper walls of protrusions 222 and 224 define a platform at 252 and 254 upon which rests a pad 256 upon which rest the glazing and the spacer 246.

Further reference to the construction of the vertical glazing bar 30 will be made hereinbelow since the construction of this bar and other like bars in the structure constitute a significant feature of the invention, especially as regards the provision of the track channels 184 and 186. Before this discussion is undertaken, however, reference will next be made to FIGS. 3 and 4 which illustrate, in greater detail and/or diagrammatically, some of the features of the ridge structure 90 appearing in FIG. 1. For purposes of orientation, attention is drawn in FIGS. 3 and 4 to vertical glazing bar 30, shades 80 and 82, motorized roller system 94, guide roll 102 and blower system 140 which have been mentioned hereinabove.

From what has been stated above, it will now be obvious that the glazing bars constitute supporting members or structures for the glazing. These supporting members are accommodated in and rest against the ridge structure 90. They provide track channels for receiving and guiding the respective shades. The ridge member 90 is structurally and functionally related therewith in a manner next to be described below.

Ridge structure 90 includes a rear wall 300 consisting of upper and lower parts 302 and 304. The upper and lower parts are connected through the intermediary of a thermal break member 306 which is made of insulative material accommodated in appropriate receptacles 308 and 310 respectively provided on the upper and lower parts 302 and 304. The ridge structure 90 also include upper wall 312 and lower wall 314. Moreover, it includes a front wall indicated at 316. Cooperatively, these walls define an internal chamber 318 within which is accommodated the blower 140.

The front wall 316 is provided with a vent indicated generally at 320. Associated with this vent is a removable shutter 322 which may be employed, for example, during cold weather seasons to shut off the escape of air from within the solar greenhouse. The front wall 316 has an auxiliary portion 324 connected thereto through the intermediary of a thermal break member 326. This auxiliary member 324 supports a receptacle 328 which is a glazing receptacle to accommodate and support appropriate glazing panels at the upper extremity of the front portion of the glazing of the solar greenhouse. An exemplary panel is diagrammatically illustrated at 330. It may consist of spaced panes 332 and 334 separated, for example, by a spacer 336. The panel 330 is held in place by a gasket shown at 338. A screen for preventng the influx of insects and the like is indicated at 340. It is associated with the vent 320. A second vent is indicated at 342. Cooperating therewith is a gravity operated flap 344 which likewise prevents the influx of foreign matter. The strength of the flow of air passing outwardly through the vent 342 is sufficient to open the flap 344 to the extent required.

Figure 4:
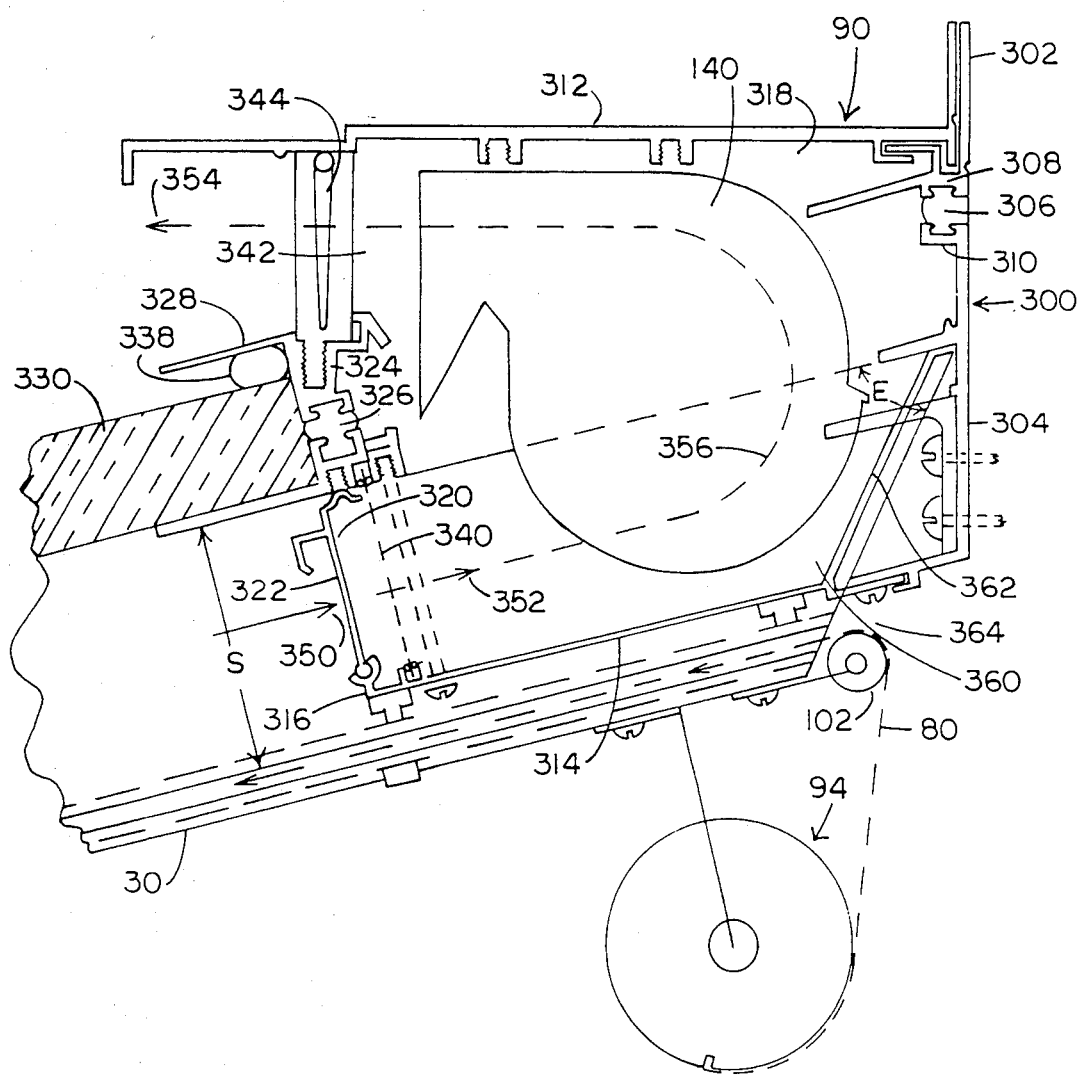
FIG. 4 is a partially diagrammatic view corresponding section line B—B of FIG. 1.

FIG. 4 specifically illustrates the flow of air. Flow through the vent 320 is indicated by arrows 350 and 352. Flow of air through vent 342 is indicated by arrow 354. The circuitous route is indicated by dotted line path 356. It will now be noted that the utilization of the glazing bar with its track channels 184 and 186 and the function of supporting the associated glazing defines a space between the shades and glazing. This space is indicated in FIG. 4 at S. This spacing S is a minimum of about 1½ inches. It is intended to assist in limiting the temperature which air entrapped between the glazing and shade may reach. This function is further accomplished by the utilization of the blower 140 which displaces or withdraws air from between the glazing and the shades and propels this air along the route 356 through the vent 320 and expels this air into ambient atmosphere through the vent 342. The the ridge structure and its blower cooperate with the glazing bar and the shades in both a structurally supportative and temperature controlling manner.

It will now be noted that the end portion 360 at the upper extremity of the glazing bar 30 has an extremity indicated at 362 which is angularly related both to the longitudinal axis of bar 30 and to the rear wall 304 of the ridge structure 90. This is intended to provide a space 364 within which to accommodate at least a partial intrusion of the guide roll 102. Thus the guide roll 102 may be conveniently positioned to guide the shade 80 from the roller system 94 into the associated track channels.

Similarly, the bottom extremity of the glazing bar 30 as indicated at 366 in FIG. 2 is angularly related to the walls between which it extends. The purpose of this angular construction is different from that of the upper extremity. It is intended to provide an appropriate relationship with the drain 158 thereby to permit a proper resting of the bottom extremity of bar 130 on the upper wall 154 and to permit an ease in installing the glazing bar 30 when the structure is being assembled.

Figure 3:
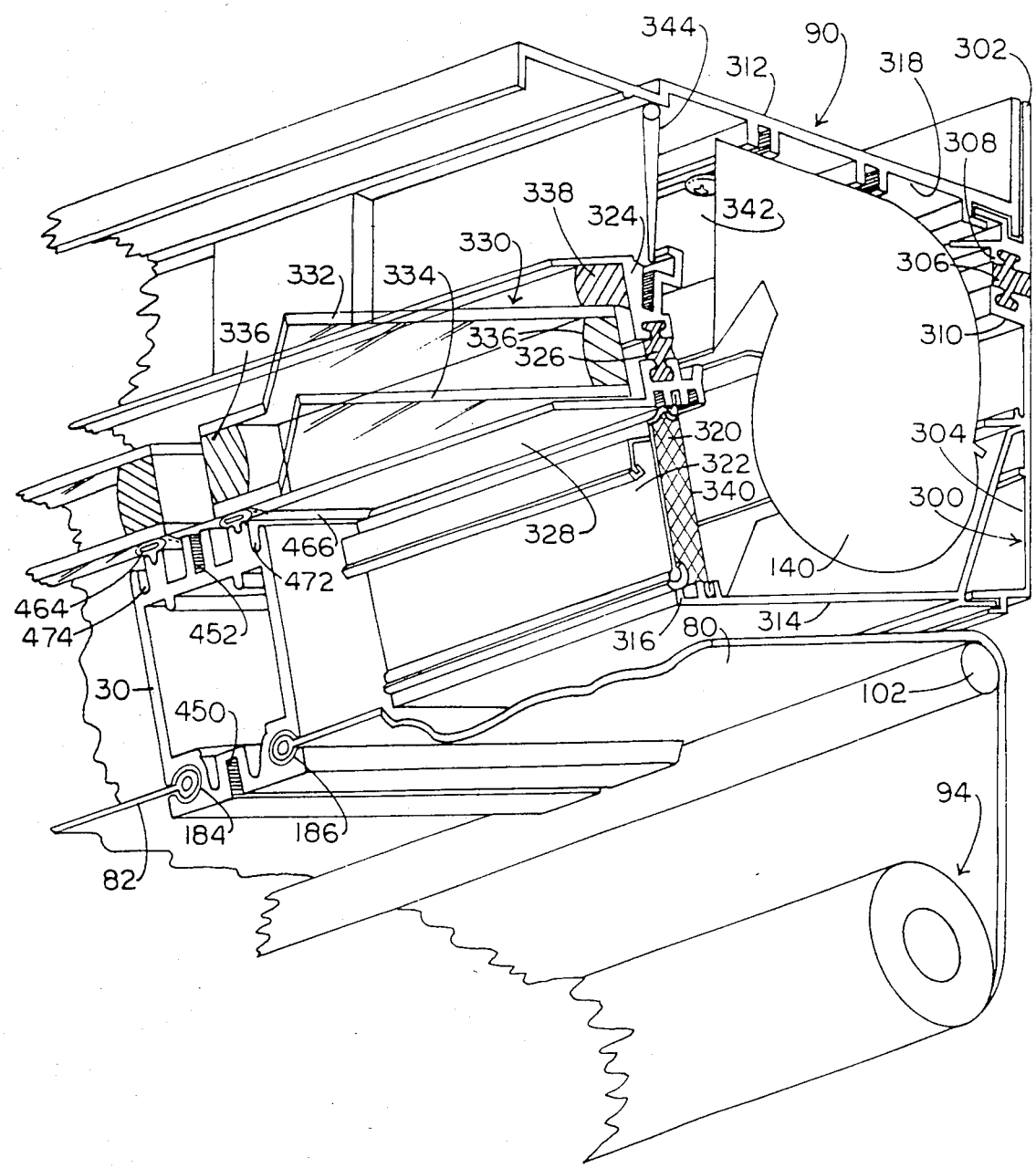
FIG. 3 is a view of the ridge structure of FIG. 1 in correspondence with line B—B therein, the view being on a large scale and being partially diagrammatic in nature.
Figure 5:
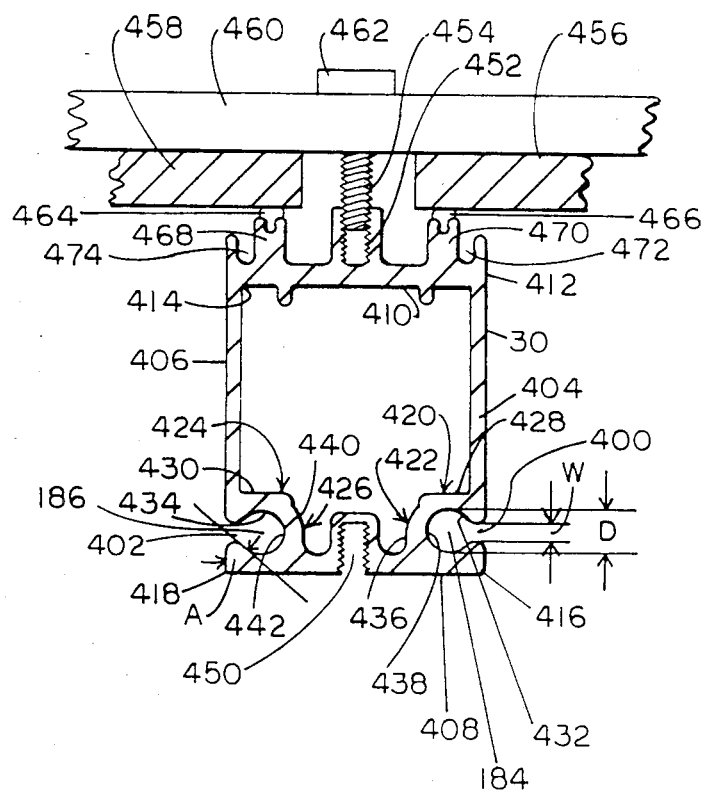
FIG. 5 is a sectional view corresponding to line C—C in FIG. 1 but further illustrating a glazing and muntin connected thereto.

An examination of FIG. 5, which is in part, a section of glazing bar 30, will next be undertaken in conjunction with an understanding of FIGS. 2, 3, and 4. In FIG. 5 appears the track channels 184 and 186. By reference to the other figures, it will be understood that these channels extend longitudinally through the glazing bar which is itself an extended member. Associated with the channel 184 is a mouth 400. Associated with the track channel 180 is a mouth 402. These mouths are of relatively restricted dimensions. They form and constitute slots extending longitudinally along the glazing bar 30. The track channels 184 and 186 are in a preferred embodiment of the invention preferably of circular conformation. An example diameter of these track channels is indicated at D. The width of the associated mouths is indicated by way of example of W. The arrangement is such, that the width W is preferably no more than 50% of the dimension D. This, in effect, forms a reentrant angle indicated, by way of example, at A. The purpose of this is to form a track channel in which the bulbous periphery of the associated lateral edges of the corresponding shades are entrapped. This entrapment coupled with appropriate spacing of pairs of associated glazing bars enables the shades to be held in taut condition thereby avoiding sagging and the like. It also enables the bulbous portions to be vigorously guided along appropriate paths even as these paths turn through an angle associated with the curved eave portions of the overall construction. Thus the use of associated guide rolls or the like in the vicinity of the curved eave portions is avoided.

It will be noted that the glazing bar includes two side walls 404 and 406. These side walls extend between and connect inner wall 408 and outer wall 410. The arrangement of the wall is such that the glazing bar is in its preferred form quadrilateral in cross-section thereby defining four corners indicated in the drawing at 412, 414, 416 and 418. The track channels 184 and 186 are generally located at the corners 416 and 418. They are furthermore formed by interior walls indicated at 420, 422, 424 and 426. The walls 420 and 424, which partly define channels 184 and 186, have surfaces 428 and 430 which are flat. They also have surfaces 432 and 434 which conform to the shape of the channels. On the other hand, wall 422 has surfaces 436 and 438 both of which conform to the shape of the associated channel. Wall 428 likewise has surfaces 440 and 442 which conform to the shape of the associated channel 186.

In the wall 408 is provided a screw threaded groove 450. By means of this groove, attachments of various types may be provided by fastening members threadably engaged therein to provide for the connection or hanging of various types of auxiliary members or elements on the interior of the solar greenhouse. A corresponding grooved slot 452 is provided in wall 410. This provides for the utilization of fastening member 454 to sandwich glazing panes, for example, 456 and 458 against the supporting structure by means of a muntin 460 or clamping member which is entrapped by the head 462 to sandwich the glazing against the sealing members 464 and 466 accommodated in sealing receptacles 468 and 470 mounted on the outer wall 410 and constituting an integral part thereof. It will be further more noted that the wall 410 is provided with drainage grooves 472 and 474. The provision of these sealing receptacles and drainage has been heretofore available, but never in association with track channels and never for the partial purpose for establishing a rigid spacing therebetween so as to provide a well defined spacing between a glazing and a associated shade arrangement as in accordance with the present invention.

Reference to FIG. 2 will show the orientation of screw threaded grooves 450 and 452 as well as seals 464 and 466 accommodated in their respective receptacles. The illustration will also show the orientation of drainage grooves 472 and 474. Not heretofore mentioned with respect to FIG. 2 is the chamber 480 defined between outer walls 152 and 220. This provides an accommodation for the upper extremity of flashing 482 the purpose of which is to provide a weather seal as between the bottom of the base sill 18 and the exterior supporting ground or other such construction.

Reference to FIG. 3 will likewise show the orientation of screw theaded grooves 450 and 452 as well as of sealing members 464 and 466 as well as drainage grooves 472 and 474.

From what has been stated above, it will be readily understood that the support arrangement of the invention, when utilized in connection with glazing or the like includes a plurality of spaced parallel glazing bars, each provided with two of the afore described track channels. These track channels are arranged in cooperating pairs and in parallel and are such that respective shades extend between these channels with the bulbous peripheries of the shades being entrapped in slidable engagement therein.

Attention is especially directed, in addition, to the horizontal base sill arrangement of the invention wherein is provided a sloped upper wall and a vertical wall extending along and upwardly from the sloped wall to define a moisture drain therewith with the vertical glazing bars including angled lower extremities accommodated in the drain formed therby such that the lower extremities of the glazing bars and the drain having matching profiles. Attention is furthermore drawn drain having matching profiles. Attention is furthermore drawn to the fact that the sill includes a base and inner and outer walls extending upwardly from the base and defining with the upper wall and internal chamber, the upper wall extending in cantilever manner from the outer wall and terminating short of the inner wall to define a slot therewith through which the shade or the cables associated therewith can pass into the internal chamber.

Attention is furthermore directed to the generally horizontal cap members which are provided covering the drain and extending between the glazing bars, these cap members including break-away sections covering the slot at least in part and being disposable in order to provide for ingress of the shading fabric.

It will be noted that in accordance with the invention, a plurality or sequence of coaxially aligned rollers or roller segments may be provided in the internal chamber of the sill, the rollers or roller segments being respectively located between respective pairs of the vertical bars to receive and accommodate a plurality of shades or shade pannels which are respectively coupled thereto. Alternatively, a single roller may be provided to extend past a plurality of the vertical glazing bars with the shade panels being connected thereto for simultaneous operation thereby.

There will now be obvious to those skilled in the art many modifications and variations of the constructions and elements set forth hereinabove. These modifications and variations will not depart from the scope of the invention if defined by the following claims.

What is claimed is:

1. A structural arrangement comprising an elongated hollow bar provided with a first longitudinally extending track channel having a relatively narrow longitudinally extending slot-type mouth, said bar being provided with a second track channel and mouth arranged in mirror image relationship to said first channel and the first said mouth and opening in opposite direction to the latter, the channels being substantially circular in cross-section and the mouths defining reentrant angles therewith, the bar being generally quadrilateral in shape and having four corners and including two pairs of parallel sides, said mouths being located in respective of the sides of one pair adjacent two of said corners, the sides of the other pair being provided with screw grooves, one of the sides of said other pair being provided with at least one channel adapted for receiving a sealing member, said structural arrangement further comprising a sealing member in the latter said channel, a glazing member against the sealing member, a muntin against the glazing member, and a fastening means extending through the muntin into the corresponding screw groove.

2. A structural arrangement as claimed in claim 1 wherein the glazing member is spaced from the first and second track channels by at least about one and one-half inches.

* * * * *